United States Patent [19]

Sell

[11] 4,304,265
[45] Dec. 8, 1981

[54] SPRING-BIASED FLAP VALVE FOR CHEMICAL PUMP AND THE LIKE

[76] Inventor: John R. Sell, 1633 Marconi Rd., Wall, N.J. 07719

[21] Appl. No.: 188,325

[22] Filed: Sep. 18, 1980

[51] Int. Cl.³ .......................................... F16K 15/16
[52] U.S. Cl. ............................................... 137/856
[58] Field of Search .............. 137/527, 527.2, 527.4, 137/527.6, 527.8, 855, 856, 857, 858; 251/368

[56] References Cited

U.S. PATENT DOCUMENTS

| 2,434,734 | 1/1948 | Buschmann | 137/857 |
| 3,664,775 | 5/1972 | Stiberg | 137/858 X |
| 3,939,867 | 2/1976 | Lundvik et al. | 137/856 X |
| 3,994,319 | 11/1976 | Airhart | 137/855 |
| 4,257,457 | 3/1981 | Namura et al. | 137/856 |
| 4,257,458 | 3/1981 | Kondo et al. | 137/855 |

FOREIGN PATENT DOCUMENTS

219343  5/1942  Switzerland ....................... 137/858

*Primary Examiner*—William R. Cline
*Attorney, Agent, or Firm*—Ralph R. Roberts

[57] ABSTRACT

This present invention pertains to a flap valve particularly used with and in chemical pumps. This valve is spring-biased to and toward a port formed in a wall of the pump. The valve includes a laminate structure at the hinge area which provides alternate Teflon and corrosion resistant, bright sheet stainless steel riveted together with front and back facing portions also of Telfon. The laminated portion has extending portions of each laminate member and in each of these portions are formed elongated apertures that are aligned to provide vertically elongated slotted holes sized to slide on the shanks of studs mounted in the wall of the pump. The extending portion of the laminate is mounted with front and back spacer members so that the laminate portion is spaced from the wall about the extent of the front facing portion. The laminated extending portion with the elongated apertures, when mounted on the studs, allows a sliding association of one member to an adjacent member so that as the valve is swung inwardly from the wall to permit fluid flow the metal members, although slightly displaced, urge the flap valve assembly toward and to a closing condition when the fluid pressure is reduced or absent.

12 Claims, 3 Drawing Figures

SPRING-BIASED FLAP VALVE FOR CHEMICAL PUMP AND THE LIKE

BACKGROUND OF THE INVENTION

1. Field of the Invention

With respect to the classification of art as established in and by the U.S. Patent Office this invention is believed to be found in the general class entitled, "Fluid Handling" (Class 137) and in the subclass entitled, "pivoted valves" (subclass 527) and even more particularly to the subclass entitled, "Valve head movably connected for accommodation to seat" (subclass 527.4).

2. Description of the Prior Art

A careful pre-Ex search was made in the art and although reed valves and structure were found the flap portion of the valves as hereinafter depicted is believed to be novel. The various flap valves as shown in the prior art are disposed to be swung into sealing arrangement by forces applied to the one side of the opening and to be moved away with forces applied from the other side of the opening. In the present invention the flap valve consists of a laminate which is held together by rivets or the like. The laminated portion is composed of thin sheets of material alternates of plastic and stainless steel. This laminate portion is carried in slots so that it can be bent and brought back into a sealed condition by the spring in the stainless steel. It is to be noted that the spring provided by the laminate flap valve provides stress relief on the hinge portion providing a long life such as fourteen million cycles.

SUMMARY OF THE INVENTION

This invention may be summarized in part with reference to its object. It is an object of this invention to provide, and it does provide, a flex valve with a laminated valve member adapted to be moved into a closure position and into a fluid passing position at an opening to a chamber. This flap portion is mounted so that a small amount of flex can and is achieved with a small slippage provided so that fracture does not occur.

In brief, this invention pertains to a flap valve in which the closure of an opening is by a laminated plate-like structure. This valve is made as a laminate and as it is primarily for chemicals has Teflon (TM duPont) and stainless steel. The laminated portion has elongated apertures to reduce the strain on the hinged area. The face portions of the valve are also provided with resilient faces, usually of Teflon. The valve, to be hereinafter more fully described, is mounted to a seat wall and is positioned at the opening to provide a one-way valve. The stainless steel portions provide the desired spring of the valve to its closed condition. This valve with other components may be used in fluid or pneumatic operations and the slide area provided in the laminate insures an extended life. The reduced-to-practice test valves have made more than fourteen million flex closings without detectable effect on the hinge portion of the laminate.

In addition to the above summary the following disclosure is detailed to insure adequacy and aid in understanding of the invention. This disclosure, however, is not intended to cover each new inventive concept no matter how it may later be disguised by variations in form or additions of further improvements. For this reason there has been chosen a specific embodiment of a spring loaded flap valve as adopted for use with fluids such as chemicals and the like and showing a preferred means for constructing and mounting this valve flap. This specific embodiment has been chosen for the purposes of illustration and description as shown in the accompanying drawing wherein:

BRIEF DESCRIPTION OF THE DRAWING

In the following description and in the claims various details are identified by specific names for convenience. These names are intended to be generic in their application. Corresponding reference characters refer to like members throughout the several figures of the drawing.

Figure 1:
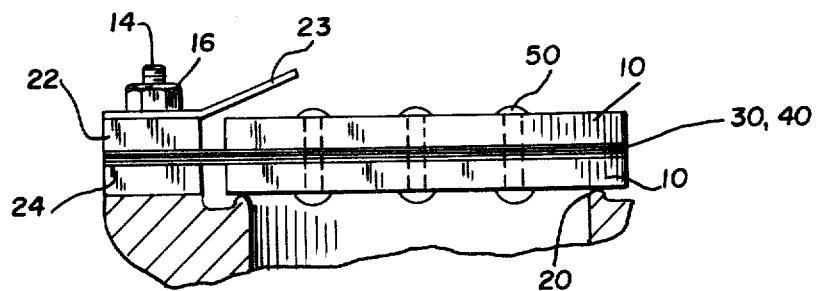
FIG. 1 represents a side view of the assembled flap valve as mounted in position adjacent an opening of a seat.
Figure 2:
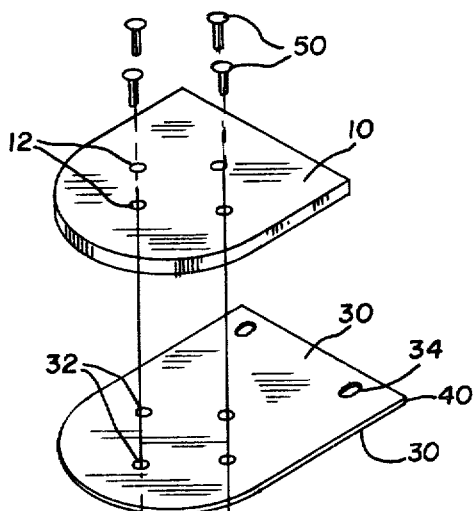
FIG. 2 represents an exploded isometric view of the several components used with and in the flap valve.
Figure 3:
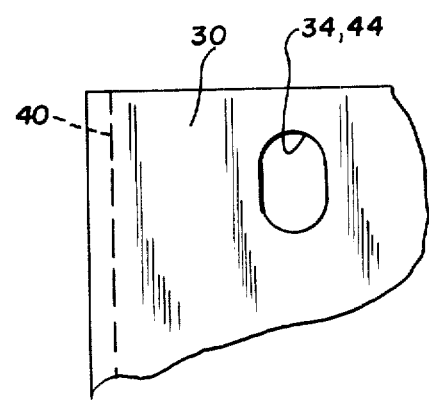
FIG. 3 represents a fragmentary, plan view of a hinge mounting of a laminate component of the flap valve.

The drawing accompanying, and forming part of, this specification disclose details of construction for the purpose of explanation but structural details may be modified without departure from the concept and principles of the invention and the invention may be incorporated in other structural forms than shown.

DESCRIPTION OF THE PREFERRED ASSEMBLY OF THE FLAP VALVE

Referring next to the drawing and the three FIGS. thereon, the flap valve of this invention includes like front and rear resilient facing member 10. This member is preferably of Teflon (TM duPont) about thirteen sixty-fourths thick. As depicted, the lower or free end is arcuate in shape and the upper end is cut transverse of its side extents. Four rivet holes 12 are formed and provided in these front and back facings. The upper end of the flap valve is carried by at least two threaded studs 14. Hex nuts 16 are mounted on the studs to secure the flap valve to a wall 18 having a seat and opening 20 therein. A plate member 22 having a lower bent limiter portion 23 also is mounted on the studs 14. Spacers 24 are mounted on the studs and have a like thickness to the facing member 10. The spacers are rectangular in configuration with holes therein to allow mounting on the secured studs.

The hinged laminate is contemplated to be of five thin sheet-like parts or portions. A center and outer portion is identified as 30 and is of plastic such as Teflon. This laminate sheet is preferably of a thickness such as five thousanths of an inch. Four rivet holes 32 are formed in each portion. The bottom end is also made arcuate to match the configuration of facing member 10. This laminate portion 30 extends upwardly to be secured on studs 14. The laminate portion 30 is provided with elongated slotted holes 34 sized and adapted to slide a small amount of the studs 14.

This laminate also includes metal sheet-like portions 40. These sheet-like portions are preferably of stainless steel with a thickness such as five to ten thousandths of an inch. The lower end is contoured so as to reduce material and/or die costs but the lower end contour is merely a matter of preference. Four rivet holes 42 are formed in each metal sheet-like portion 40. The upper portion is also made with elongated slotted holes 44 similar to holes 34 in the laminate portion 30.

USE AND OPERATION

The facing member 10 to the inside or right side has four rivets 50 placed in holes 12 with the head ends toward the outer surface and the shank portion extending through the holes. A hinged laminate is now assembled on the rivet shanks. First to be mounted is an outer portion 30 mounted on the rivet shanks and positioned by holes 32. Next is a metal portion 40 positioned by means of holes 42 then a central portion 30 is also positioned by the protruding rivet shanks. Next is mounted a metal sheet-like portion 40 and then an outer portion 30, both of which are positioned and mounted on the rivet shank. The left resilient facing member 10 is now positioned on the rivet shanks. Standard riveting technique is used to secure the rivets in place and to secure the assembly.

A resilient spacer 24 is now placed on the projecting studs 14 and then the laminate assembly is placed in position with the elongated hole areas mounted on these same studs. Another spacer 24 is now placed on the studs and the plate member 22 is now mounted on the studs with the bent limiter portion 23 disposed in an outward position as in FIG. 1. The hex nuts 16 are now mounted on the threaded studs and tightened to the desired condition. The mounting of this flap valve on studs 14 is merely one means of securing the valve in place. Cap screws may, of course, be used and rivets, staples or other means can and may be provided. The selection of the mounting is a matter for the supplier of the pump. It is only necessary that the laminated portion be attached so that the laminate may slide one on another in the limited amount needed to provide a flexure without fatigue at the bending area.

In use the hinged valve moves to cause a closing of the seat and opening 20 by the resilient facing member 10 when pressure is from right to left. The inner or turned ends of the rivets 50 are disposed within the opening 20 and do not engage or otherwise contact the seat or wall. When pressure and flow is reversed the flap valve is moved to the right to the extent necessary to permit the desired flow through the opening. The limiter 23 prevents excessive movement of the flap valve. It is also to be noted that the assembled flap structure is rather stiff and the movement is only to the extend necessary. The use of metal sheet-like portions 40 40 provide a spring return of the valve flap to its normal mounted condition and position. Spring-type metals having a high fatigue capability are desired. For example, stainless steel of a wrought 302 grade and quenchannealed has a rating of forty-two $\times 10^7$ thousand cycles. This is a very high capability and similar properties are desired in other metals when provided as an alternative or substitute. The resilient facing member 10 is only used to provide a retaining means for rivets 50 and their heads. The upper portions of the laminates are slidable on the mounting means.

A feature of this laminated assembly is the flexure permitted and provided in the laminate. The hinge portion below the spacer 24 and above the facing member 10 is a substantial space and the bending occurs only in and at this area. The laminate of the hinge comprises of alternate layers of slidable plastic and metal. Both portions are smooth in finish and are disposed to slide against the other surface. Teflon is particularly noted for a slippery surface and stainles steel sheet is normally made with a bright or polished surface. At the riveted area the laminate does not slide upon itself since the rivets 50 are a tight fit in the aligned rivet holes. At the elongated holes the laminate members move slightly relative to each other and a slight bending and displacement is made rather than a fixed bending at one point. The laminated structure with a small but definite relative sliding action makes for a flap valve assembly that is extremely durable. For example, as above noted, fourteen million actuations as a valve were made in an endurance test and when disassembled there was no discernable wear or deterioration of these portions.

In the above description the facing members 10 and the center and outer laminate portions are preferably made of Teflon but this is not to preclude the use of other slightly resilient materials. Teflon, because of its resistance to many acids, chemical mixes, fluids and/or oils, is mentioned as the preferred plastic material. The metal sheet-like portions 40 are preferably of stainless steel of a spring steel grade and with a high resistance to the same environment as the plastic used therewith. Wrought 302 type stainless steel with spring steel temper is preferred but this is not to preclude the use of spring steel, bronze or brass and other spring materials if the environment in which the valve is used so dictates.

It is very desirable that the flap valve laminate have facing surfaces that are smooth and promote a sliding action at their upper secured end whereat the laminated portions are formed and provided with elongated holes. About one-sixteenth of an inch elongation is provided with one-quarter inch studs and this amount is usually sufficient for the desired sliding of the laminates to be made. A valve of a very large size would, of course, be sized accordingly. An elongation of the hole of about twenty percent is usually sufficient. More than five laminates may be used if desired and particularly if the valve is of a large size. The thicknesses mentioned are and have been used in a valve in which the flap is about two and one-half inches wide. The overall length is about three and one-half inches.

Rivets 50 are disclosed but this does not preclude the use of staples, epoxy adhesive and the like. It is important that the extending portions of the laminate structure be free to slide upon contiguous surfaces. It is to be realized that the several members may be made as plural members, for example each of the spring members 40 may be of three or four very thin sheets such as one or two thousandths of an inch but the laminate used in said flap valve is contemplated to provide a slide capability at the hinge area. The use of the phrase "metal" in the disclosure and in the claims pertains to a finished and polished sheet-like material that has spring-like capability. Certain glass fibers are carbon fiber materials are known but the present cost is much greater than metal equivalents and reliability has not been established so the use of metal such as three hundred series stainless steel is the preferred embodiment.

Terms such as "left", "right", "up", "down", "bottom", "top", "front", "back", "in", "out" and the like are applicable to the embodiment shown and described in conjunction with the drawing. These terms are merly for the purposes of description and do not necessarily apply to the position in which the flap valve may be constructed or used.

While a particular embodiment of said valve and its construction has been shown and described it is to be understood the invention is not limited thereto since modifications may be made within the scope of the accompanying claims and protection is sought to the broadest extent the prior art allows.

What is claimed is:

1. A spring-biased flap valve for use in and with a pump having a wall and port therein, said port alternately closed and opened during fluid actuation, said flap valve providing a spring adapted to urge the flap valve into a substantially closed condition, said wall providing a support means for said flap valve when secured thereto, said flap valve including:

(a) a sheet-like facing portion of a selected thickness and having an exterior surface adapted to engage the port in said wall and when seated thereagainst to close said port to fluid flow toward the wall and facing portion, this facing portion having a given width and length greater than the port to be closed, said facing portion having aligning means provided within the facing portion;

(b) a plurality of sheet-like plastic member portions each providing sliding surfaces and in the lower portions thereof having aligning means compatible with said facing portion and with said member portions having a width similar to the facing portion when secure thereto and having a vertical extent greater than the extent of the said facing portion and in this extending extent there is formed at least two elongated apertures;

(c) a plurality of thin sheet-like spring-tempered metal member portions, each portion having an aligning means compatible with said facing portion and having a vertical extent greater than the extent of said facing portion, said extending extent similar to and disposed between and secured to said sheet-like plastic member portions with each metal member portions having like elongated apertures formed in the extending extent with at least the extending extent of the metal member portions having smooth sliding surfaces;

(d) means for securing the facing portion, the plurality of sheet-like plastic members and interspaced spring-tempered metal members in an aligned condition and with the extending extents of the laminate providing an axial alignment of the elongated apertures;

(e) at least one spacer member positioned adjacent the wall and having substantially the same thickness as the facing member, this spacer next to the wall carried on at least two securing stud-like means attached to said wall, each providing a shank on which the elongated apertures of the sheet-like plastic portions and spring-tempered metal portions may be secured, and (f) means for securing said sheet-like portions and the spring-tempered metal portions on said stud-like means and with the spacer retaining the flap valve in the desired condition and position away from the wall so that the member portions having the elongated apertures may provide a hinge area and slide with respect to one another as the valve is swung inwardly to permit fluid flow with the metal members urging the flap valve assembly toward and to the closing condition when fluid pressure is reduced or absent.

2. A spring-biased flap valve as in claim 1 in which the securing of the facing portion, the sheet-like plastic member portions and the spring-tempered metal member portions is by rivets passed through appropriately sized and positioned holes and the shank ends of these rivets are then peened into a securing condition.

3. A spring-biased flap valve as in claim 2 in which the flap valve also includes a like facing portion placed at the rear of the valve and providing additional protection to the thin sheet-like plastic member adjacent the inside of the valve assembly.

4. A spring-biased flap valve as in claim 3 in which the facing portions and the sheet-like plastic members are of Teflon.

5. A spring-biased flap valve as in claim 4 in which the spring-tempered metal member is chemical resistant stainless steel.

6. A spring-biased flap valve as in claim 1 in which the spacer member next to the wall is configured so as to provide in a mounted condition a space between the spacer member and the below facing portion, said space sufficient for the free swinging of the valve to its limits of intended movement without interference of the spacer member and the front facing portion.

7. A spring-biased flap valve as in claim 6 in which there is also provided a rear spacer member of like size and configuration to the front spacer member and in mounted condition this rear spacer member provides a securing means without interference with the hinge area of the valve.

8. A spring-biased flap valve as in claim 7 in which there is also provided a plate member adjacent to and outward of the rear spacer member, this place member having a skirt portion which is bent away from the wall opening and limits the bending of the flap valve portion at the hinge area between the rear spacer and the flap valve.

9. A spring-biased flap valve as in claim 8 in which the flap valve assembly and the means for mounting includes studs secured in the wall and the valve assembly is mounted on these studs and secured in place with threaded nuts tightened in place thereon.

10. A spring-biased flap valve as in claim 8 in which the flap valve assembly and the means for mounting includes cap screws secured in threaded apertures in the wall and the valve assembly is mounted on these cap screws when and as secured in place with elongated apertures slidably retained by said cap screws.

11. A spring-biased flap valve as in claim 8 in which the rear spacer member in the attached position provides a spaced condition in which the hinge area is free of other contacts and the bent away portion of the plate member provides only an outward limit to the swing of the valve.

12. A spring-biased flap valve as in claim 1 in which said plurality of sheet-like plastic member portions are of Teflon and are at least three in number and are alternately disposed between the sheet-like spring-tempered metal member portions of bright finished stainless steel.

* * * * *